(12) United States Patent
Mochizuka et al.

(10) Patent No.: US 6,710,907 B2
(45) Date of Patent: Mar. 23, 2004

(54) SOLID STATE ELECTROCHROMIC DEVICE, AND MIRROR SYSTEM AND CRT DISPLAY USING SAME

(75) Inventors: Takuo Mochizuka, Shizuoka (JP); Yoshiyuki Terada, Shizuoka (JP)

(73) Assignee: Murakami Corporation, Shizuoka (JP)

( * ) Notice: Subject to any disclaimer, the term of this patent is extended or adjusted under 35 U.S.C. 154(b) by 36 days.

(21) Appl. No.: 10/089,080

(22) PCT Filed: Sep. 25, 2001

(86) PCT No.: PCT/JP01/08297

§ 371 (c)(1),
(2), (4) Date: Apr. 10, 2002

(87) PCT Pub. No.: WO02/39180

PCT Pub. Date: May 16, 2002

(65) Prior Publication Data

US 2002/0149829 A1 Oct. 17, 2002

(30) Foreign Application Priority Data

Nov. 10, 2000 (JP) ......................................... 2000-342918

(51) Int. Cl.[7] ............................ G02F 1/153; G02F 1/15
(52) U.S. Cl. ..................... 359/271; 359/265; 359/269
(58) Field of Search .................... 359/265, 267, 359/269, 270, 27, 1, 273, 274; 348/817

(56) References Cited

U.S. PATENT DOCUMENTS

| 4,056,881 | A | | 11/1977 | Holt et al. |
| 5,066,112 | A | | 11/1991 | Lynam et al. |
| 5,148,306 | A | * | 9/1992 | Yamada et al. ............. 359/271 |
| 5,708,487 | A | | 1/1998 | Bergman |
| 6,062,920 | A | * | 5/2000 | Jordan et al. ............... 439/861 |
| 6,471,360 | B2 | * | 10/2002 | Rukavina et al. ........... 359/609 |

* cited by examiner

*Primary Examiner*—Georgia Epps
*Assistant Examiner*—William Choi
(74) *Attorney, Agent, or Firm*—Oblon, Spivak, McClelland, Maier & Neustadt, P.C.

(57) ABSTRACT

There is provided a solid-state electrochromic device including a lower transparent conductive layer (12) formed into filmy shape on a glass substrate, partially provided with a groove (12b), and insulated with the groove (12b), an electrochromic layer (13) layered on the lower transparent conductive layer (12), and an upper transparent conductive layer (14) in direct contact with an insulated portion (12a) of the lower transparent conductive layer. Metal foil terminals (17) made of a metal foil (17a) to which an electrically conductive adhesive material (17b) is applied are bonded to an end of a body portion (12c) of the lower transparent conductive layer and an end of the insulated portion (12a) of the insulated lower transparent conductive layer.

6 Claims, 4 Drawing Sheets

SOLID STATE ELECTROCHROMIC DEVICE, AND MIRROR SYSTEM AND CRT DISPLAY USING SAME

TECHNICAL FIELD

This invention relates to a solid-state electrochromic device using a metal foil terminal as a lead-in terminal for electrodes of the device, and a mirror system and CRT (or Cathode Ray Tube) display using the device.

BACKGROUND ART

Reversible transitions between colored and colorless states upon oxidation or reduction caused reversibly by application of voltage are called the phenomenon of electrochromism. Electrochromic (hereinafter referred to as EC) devices that use materials presenting such electrochromic features and are designed to change the color states by manipulating voltages are utilized for display devices, light quantity control devices, and the like across various industrial fields.

An example of conventional solid-state EC devices is illustrated in FIG. 6. In a solid-state EC device 30, a lower transparent conductive coating 32 made of indium tin oxide (ITO) or the like is provided on a glass substrate 31, and a groove 32b is formed to provide an insulated portion 32a in part of the lower transparent conductive coating 32. Subsequently, an EC layer 33 made of $WO_3$ or the like, and an upper transparent conductive coating 34 made of ITO or the like are layered thereon in sequence; these layers are covered with a sealant 35 made of epoxy resin or the like, and an opposed glass plate 36. Moreover, the upper transparent conductive coating 34 is in direct contact with the insulated portion 32a, while the lower transparent conductive coating 32 and the upper transparent conductive coating 34 are formed in such a manner as not to short-circuit, so that a terminal of the upper transparent conductive coating 32 may be derived from the insulated portion 32a. Upon application of a direct-current (DC) voltage across the lower transparent conductive coating 32 and upper transparent conductive coating 34 of the solid-state EC device 30, the EC layer 33 gets colored, and upon application of a reverse voltage, the EC layer 33 gets colorless.

Supplying power from an external source to the lower and upper transparent conductive coatings 32, 34 of the solid-state EC device 30 requires a lead-in terminal to be provided. Conventionally, the glass substrate 31 and the lower transparent conductive coating 32 are held with a metal clip 37, and the glass substrate 31 and the insulated portion 32a are held in like manner; then, each clip 37 is fastened with the sealant 35 and used for a lead-in terminal. The opposed glass plate 36 is bonded in such a manner as to guide a terminal portion of the metal clips 37, 37, and thus the width dimension of the opposed glass plate 36 is shorter than the width dimension of the glass substrate 31.

However, difficulty in working metal materials into the metal clip 37 having several tens of micrometers or so that is as small as the thickness of a resin of the solid-state EC device 30 would disadvantageously impose limitations on the width of the opposed glass plate 36 not wider than the width of the glass substrate 31. In addition, insufficient introduction of stress due to a reduced metal thickness would make it difficult for the metal clip 37 to exert a holding power thereof derived from a stress introduced within a resiliency range, disadvantageously impairing operability upon attachment.

Further, if an end face of the glass substrate 31 is curved, the metal clip 37 is hard to curve along the end face of the substrate 31; thus a contact resistance is increased and/or an outer appearance is impaired. These disadvantages would result from application of the solid-state EC device 30 to a mirror, as well.

On the other hand, as is often the case with a normal CRT display, a VDT (video display terminal) hazard prevention filter is externally attached on a front face of a display panel; however, the filter shields from electromagnetic fields of a wide range of wavelengths, so that a whole screen area disadvantageously becomes too dark to provide a clear image.

As shown in FIG. 7, when a conventional solid-state EC device 30 is used for a CRT display filter, the following two approaches are to be adopted for attaching the solid-state EC device 30. This is because the metal clip 37 for applying a voltage to the solid-state EC device 30 are necessitated by workability constraints to use a metal plate of approximately 100 $\mu$m in thickness. Moreover, the metal clip 37 basically realizes a holding power against the glass substrate 31 by spring tension, and thus is shaped like a clip. Accordingly, the thickness and shape of the metal plate result in excessive vertical thickness of the metal clip 37. Therefore, the solid-state EC device 30 should be attached on the CRT display with consideration given to the thickness of the metal clip 37.

The first approach is to provide spacing between a solid-state EC device 30A and a CRT 39, as shown in FIG. 7(a). A description will be given herein of the reason why this approach is applicable. Generally, a front face of the CRT 39 is curved as shown in FIG. 7, while the solid-state EC device 30A with an opposed glass plate 36A is made by adhering the opposed glass plate 36A with an epoxy resin, or the like, and is thus difficult to form so as to follow the curved shape. Accordingly, this approach proposes to space the solid-state EC device 30A and the CRT 39 apart so as not to bring the metal clip 37A into contact with the front face of the CRT 39, to avoid the necessity for forming the opposed glass plate 36A so as to follow the curved shape of the front face of the CRT 39. However, this approach would disadvantageously make the CRT display thick frontward by the filter (solid-state EC device 30A), and need a mounting member. It would also be a conceivable approach to work the glass substrate 31A and/or the opposed glass plate 36A as conforming to the curved shape of the CRT 39 in advance, but that would incur extra costs.

The second approach is to bond a solid-state EC device 30B larger than a CRT 40 to the CRT 40, as shown in FIG. 7(b). A description will be given herein of the reason why this approach is applicable. This approach utilizes a glass panel of the CRT 40 as a substitute for an opposed glass plate, while the glass substrate 31A is worked to assume such a shape as conforming to a curved shape of the CRT 40. Then, the solid-state EC device 30B is bonded onto the glass panel of the CRT 40 through an epoxy resin, or the like as a sealant 35B. In this configuration, the epoxy resin as the sealant 35B is several tens of micrometers or so in thickness, but the metal clip 37B is so large as envisaged from the thickness of a metal plate thereof which alone embraces 100 $\mu$m or so. Accordingly, if the width dimension of the glass substrate 31B were made shorter than the width dimension of the glass panel, the metal clip 37B would protrude and become an obstacle upon bonding the solid-state EC device 30B to the CRT 40. In view of these circumstances, this approach uses the glass substrate 31B of which the width dimension is greater than that of the glass panel of the CRT 40, and the solid-state EC device 30B is bonded to the CRT 40. Consequently, the metal clips 37B, 37B jut out to the sides of the CRT 40, and thus never become an obstacle. However, this approach disadvantageously results in increase in size of the solid-state EC device 30B as a filter of a CRT display.

SUMMARY OF THE INVENTION

The present invention is herein proposed for the purpose of eliminating the above-described disadvantages in prior arts. It is an object of the present invention to provide a solid-state EC device and mirror system using the device, which solid-state EC device has an electrode structure including a terminal that is easy to work into various shapes, and thus contributing to improved operability upon attachment. Further, it is another object of the present invention to provide a CRT display that employs the above device and is thereby adjustable for transmittance or luminance within a specific range.

In order to achieve the above objects, a solid-state EC device according to the present invention comprises a lower transparent conductive layer formed into filmy shape on a glass substrate, partially provided with a groove, and insulated with the groove, an electrochromic layer layered on the lower transparent conductive layer, an upper transparent conductive layer formed into filmy shape over a portion insulated with the groove of the lower transparent conductive layer, and a top of the electrochromic layer, and a sealant and opposed glass plate laminated on the upper transparent conductive layer. In addition, metal foil terminals made of a metal foil to which an electrically conductive adhesive material is applied are bonded to an end of the lower transparent conductive layer and an end of the insulated portion of the lower transparent conductive layer in order to apply a driving voltage to the electrochromic layer. This construction allows the terminals to be attached with ease, and thus achieves improved operability upon attachment.

There is also provided a solid-state EC device as thus constructed in which the metal foil terminals are made of any one of copper and aluminum foils, and/or in which the metal foil terminals have undergone anti-corrosive treatment. These constructions may provide a more reliable solid-state electrochromic device.

Moreover, in order to achieve the above objects, there is provided a mirror system using a solid-state electrochromic device according to the present invention, which comprises a metal reflective coating formed into filmy shape on a glass substrate, a lower transparent conductive layer formed into filmy shape on the metal reflective coating, partially provided with a groove, and insulated with the groove, an electrochromic layer layered on the lower transparent conductive layer, an upper transparent conductive layer formed into filmy shape over a portion insulated with the groove of the lower transparent conductive layer, and a top of the electrochromic layer, and a sealant and opposed glass plate laminated on the upper transparent conductive layer. In addition, metal foil terminals made of a metal foil to which an electrically conductive adhesive material is applied are bonded to an end of the lower transparent conductive layer and an end of the insulated portion of the lower transparent conductive layer in order to apply a driving voltage to the electrochromic layer. This construction easily makes the inventive solid-state EC device applicable to mirror systems.

Moreover, in order to achieve the above object, a CRT display according to the present invention includes a glass panel, and a filter layer formed on a front face of the glass panel, the filter layer being comprised of a solid-state electrochromic device that uses the glass panel for an opposed glass plate, and includes a lower transparent conductive layer and metal foil terminals to which an electrically conductive adhesive material is applied, and the metal foil terminals are located at an end portion of the lower transparent conductive layer. This construction easily makes the inventive solid-state EC device applicable to CRT displays, and thus provides a CRT display adjustable for transmittance or luminance within a specific range.

Further, there is provided a CRT display as described above in which the filter layer comprised of the electrochromic device includes a lower transparent conductive layer formed into filmy shape on a glass substrate, partially provided with a groove, and insulated with the groove, an electrochromic layer layered on the lower transparent conductive layer, an upper transparent conductive layer formed into filmy shape over a portion insulated with the groove of the lower transparent conductive layer, and a top of the electrochromic layer, and a sealant and opposed glass plate laminated on the upper transparent conductive layer. In addition, metal foil terminals made of a metal foil to which an electrically conductive adhesive material is applied are bonded to an end of the lower transparent conductive layer and an end of the insulated portion of the lower transparent conductive layer in order to apply a driving voltage to the electrochromic layer.

In the present invention, the glass substrate is positioned at a lower side, and the opposed glass plate at an upper side, by way of example. It goes without saying that the construction may be illustrated upside down.

MODE(S) FOR CARRYING OUT THE INVENTION

A description will now be given of preferred embodiments of the present invention with reference to the accompanying drawing.

Figure 1:
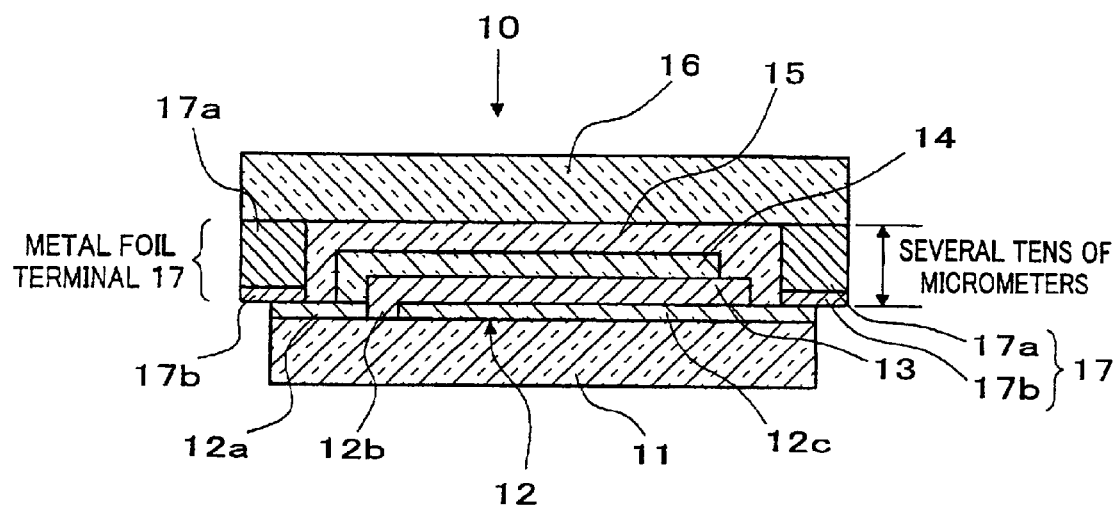
FIG. 1 is a sectional view of a solid-state EC device according to an embodiment of the present invention.

Referring first to FIG. 1, a description will be given of a solid-state EC device according to an embodiment of the present invention. FIG. 1 is a sectional view of the solid-state EC device according to the embodiment of the present invention.

As shown in FIG. 1, a solid-state EC device 10 is provided with a lower transparent conductive coating 12 made of ITO or the like on a top face of a glass substrate 11, and a groove 12b is formed in part of the lower transparent conductive coating 12 so as to provide an insulated portion 12a. The lower transparent conductive coating 12 is comprised of two portions, that is: an insulated portion 12a insulated with the groove 12b, and a body portion 12c, in order to obtain terminals for two electrodes from these portions. The width dimension of the lower transparent conductive coating 12 including the insulated portion 12a and the body portion 12c is the same as that of the glass substrate 11. On a top face of the lower transparent conductive coating 12, an EC layer 13 made of $WO_3$ or the like is layered, and on a top face of the EC layer 13, an upper transparent conductive coating 14 made of ITO or the like is layered, in this sequence. A top face of the upper transparent conductive coating 14 is covered with epoxy resin 15 as a sealant, and a top face of the epoxy resin 15 is covered with an opposed glass plate 16. The upper transparent conductive coating 14 is in direct contact with the insulated portion 12a, and the body portion 12c of the lower transparent conductive coating 12 and the upper transparent conductive coating 14 are formed so as not to short-circuit, so that a terminal of the upper transparent conductive coating 14 may be led out from the insulated portion 12a. To be more specific, the EC layer 13 is formed in the groove 12b, too, and the EC layer 13 is sandwiched between the body portion 12c of the lower transparent conductive coating 12 and the upper transparent conductive coating 14, and between the body portion 12c and the insulated portion 12a of the lower transparent conductive coating 12. In addition, the epoxy resin 15 covers a side face of the EC layer 13 and the upper transparent conductive coating 14, and outer ends of the epoxy resin 15 are in contact with the insulated portion 12a and body portion 12c of the lower transparent conductive coating 12. The EC layer 13 extends in width from the groove 12b to cover almost all of the top face, but to a position just short of an outer extremity, of the body portion 12c. The upper transparent conductive coating 14 extends in width from the inner end of the insulated portion 12a to cover almost all of the top face of the EC layer 13. The epoxy resin 15 has a width dimension shorter than that of the lower transparent conductive coating 12 including the insulated portion 12a and body portion 12c, but entirely covers the EC layer 13 and the upper transparent conductive coating 14. The opposed glass plate 16 has a width dimension greater than that of the lower transparent conductive coating 12 including the insulated portion 12 and body portion 12c (i.e., of the glass substrate 11) to protrude beyond both sides of the glass substrate 11.

Further, between a top face of an outer end portion of the body portion 12c of the lower transparent conductive coating 12 and a bottom face of an outer end portion of the opposed glass plate 16, and between a top face of an outer end portion of the insulated portion 12a and a bottom face of an outer end portion of the opposed glass plate 16, metal foil terminals 17, 17 each comprised of a metal foil 17a and an electrically conductive adhesive material 17b applied to a bottom face of the metal foil 17a are attached at both sides and fastened with an epoxy resin 15. In that event, a contact between the lower transparent conductive coating 12 and the metal foils 17, 17 is secured by adhesion inherent in the electrically conductive adhesive material 17b. Moreover, the metal foil 17a is made of a metal material such as copper and aluminum, and has undergone anti-corrosive treatment.

Upon application of a DC voltage across the lower transparent conductive coating 12 and the upper transparent conductive coating 14 from an external source through the metal foil terminals 17, 17 of the solid-state EC device 10, the EC layer 13 gets colored; on the other hand, upon application of a reverse voltage, the EC layer 13 gets colorless.

Among materials usable for the electrically conductive adhesive material 17b are a sliced floc sheet of foam rubber in which fine powder of electrically conductive materials is mixed, and a release liner which methyl silicone resins are applied to, and then electrically conductive pressure-sensitive adhesive materials are applied to or impregnated in, the electrically conductive pressure-sensitive adhesive materials being made of methyl phenyl copolymerized silicone contained resins blended with a dielectric filler. The anti-corrosive treatment may be implemented for example by a method of applying silicone resins, or the like.

In like manner, use of the metal foil terminal 17 made by applying the electrically conductive adhesive material 17b onto a bottom of the metal foil 17a as a terminal would improve operability in the terminal attachment process that only requires bonding the metal foil terminal 17 at a predetermined position using adhesion inherent in the electrically conductive adhesive material 17b upon attachment of terminals.

Figure 6:
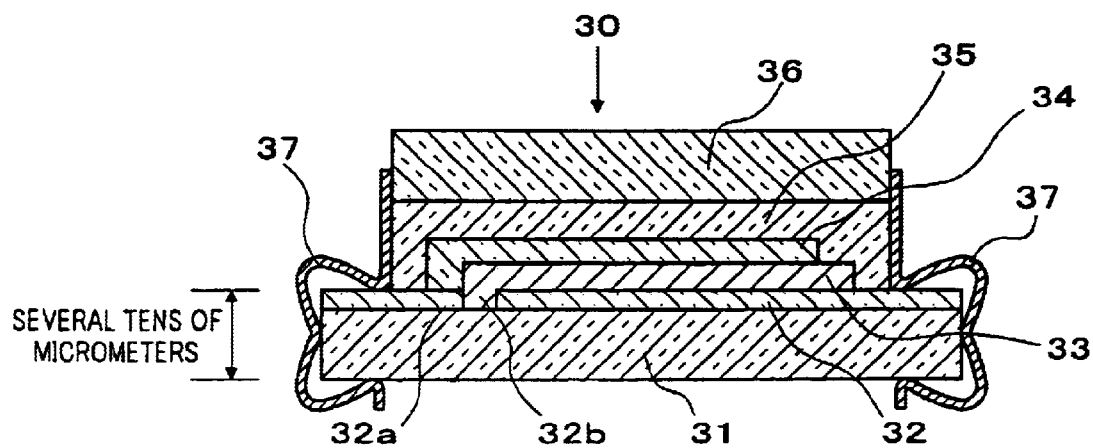
FIG. 6 is a sectional view for explaining an example of a structure of a conventional solid-state EC device.
Figure 7:
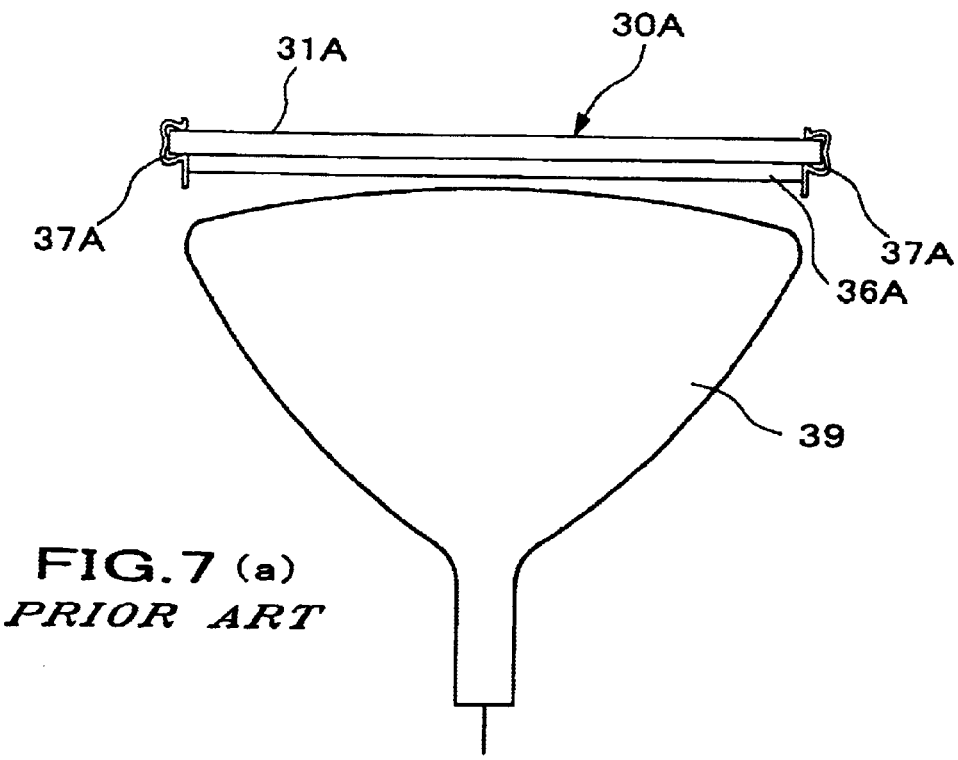
FIG. 7 is a schematic plan view of a solid-state EC device and CRT when a conventional solid-state EC device is used as a filter for a CRT display; (a) shows a method of providing spacing between the solid-state EC device and the CRT, and (b) shows a method of bonding the solid-state EC device larger than the CRT to the CRT.
Figure 7:
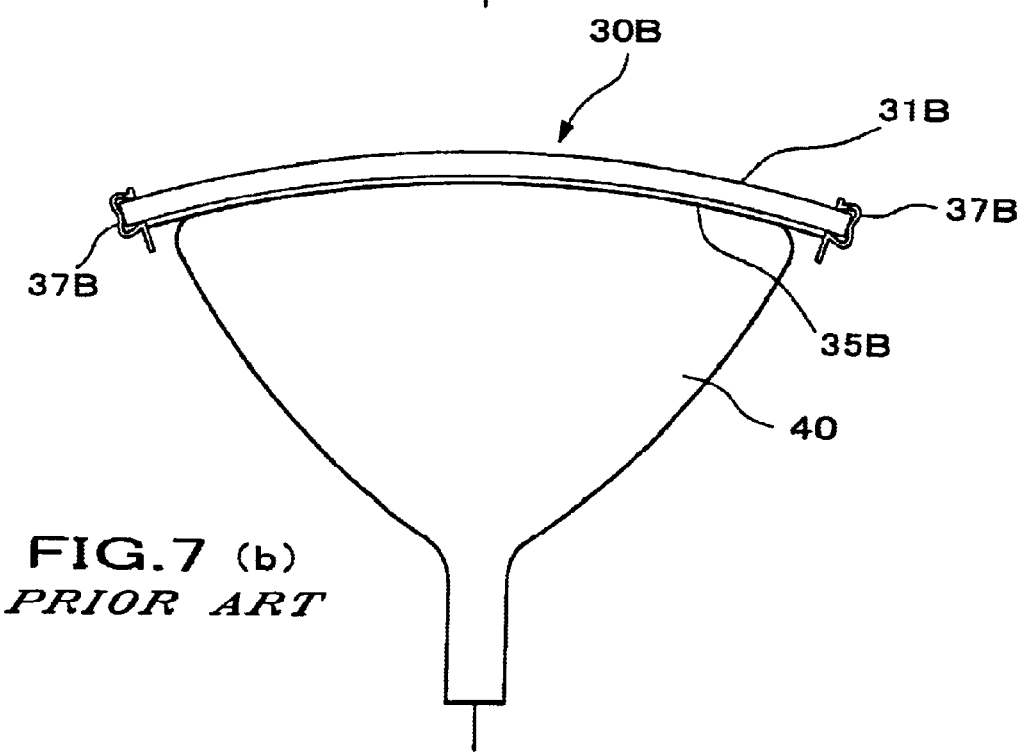

A conventional opposed glass plate 36 is configured to be several millimeters smaller than the glass substrate 31 as shown in FIG. 6 because a terminal portion of the metal clip 37 is bonded to a guide, but the inventive metal foil terminal 17 allows the opposed glass plate 36 to be made as large as or larger than the glass substrate 11 (e.g., as an embodiment applied to a CRT display that will be discussed later).

Further, although a distance between a surface of the lower transparent conductive coating 12 and the opposed glass plate 16 (hereinafter referred to as a resin thickness) is generally configured to be several tens of micrometers or so, the metal foil 17a and the electrically conductive matter of the electrically conductive adhesive material 17b may be deformed with ease, and may thus be pressed to follow the resin thickness.

The metal foil terminal 17 as a lead-in terminal has a simple structure that is made of the metal foil 17a and the electrically conductive adhesive material 17b applied to one side of the metal foil 17a, and may therefore be easily worked into various shapes as conforming to a product's shape even if the shape is complicated, so that a contact resistance may be lowered and a neat appearance may be presented.

Figure 2:
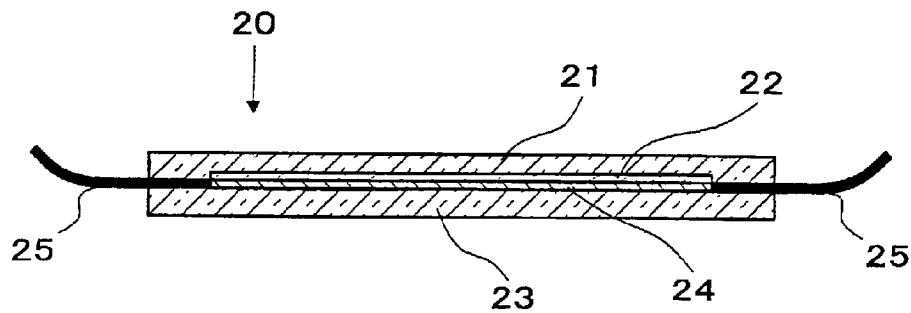
FIG. 2 is a schematic sectional view of a mirror system using a solid-state EC device according to an embodiment of the present invention.

Referring next to FIG. 2, a description will be given of a mirror system using the solid-state EC device according to the present invention. FIG. 2 is a schematic sectional view of the mirror device using the solid-state EC device according to the present invention.

As shown in FIG. 2, the mirror system 20 comprised of the solid-state EC device includes a metal reflective coating 22 formed into filmy shape on a top of a glass substrate 21, a lower transparent conductive coating (not shown) formed into filmy shape on a top of the metal reflective coating 22, partially provided with a groove, and insulated by the groove, an EC layer 24 formed into filmy shape on a top of the lower transparent conductive coating, an upper transparent conductive coating (not shown) formed into filmy shape over an insulated portion of the lower transparent conductive coating and a top of the EC layer 24, and a sealant (not shown) and opposed glass plate 23 laminated on the upper transparent conductive coating; metal foil terminals 25, 25 made of a metal foil to which an electrically conductive adhesive material is applied are bonded to each end of a body portion of the lower transparent conductive layer and the insulated portion of the lower transparent conductive layer. The metal foil terminals 25, 25 are attached with one end thereof sandwiched between the opposed glass plate 23 and the insulated portion or body portion of the lower transparent conductive coating, and the other end extending to the outside. The width dimension of the metal reflective coating 22 is shorter than that of the glass substrate 21 at both sides. The width dimension of the opposed glass plate 23 is the same as that of the glass substrate 21. Since a lamination structure of the upper and lower transparent conductive coatings, sealant (epoxy resin), and EC layer 24 is the same as that as shown in FIG. 1, a detailed illustration and description has been omitted. This construction enables an easy attachment of the terminals and thus serves to improve the operability upon attachment. The use of the metal foil terminal 25 allows the lead-in terminals to be worked into various shapes as conforming to the shapes of the glass substrate 21, opposed glass plate 23, metal reflective coating 22, and the like, and may thus serve to make the width dimension of the opposed glass plate 23 be the same as that of the glass substrate 21 as in the mirror system 20. Further, the use of the metal foil terminal 25 may serve to make the lead-in terminals shaped variously according to an installing location or use conditions of the mirror system 20, as well as to make the lead-in terminal thinner.

Figure 3:
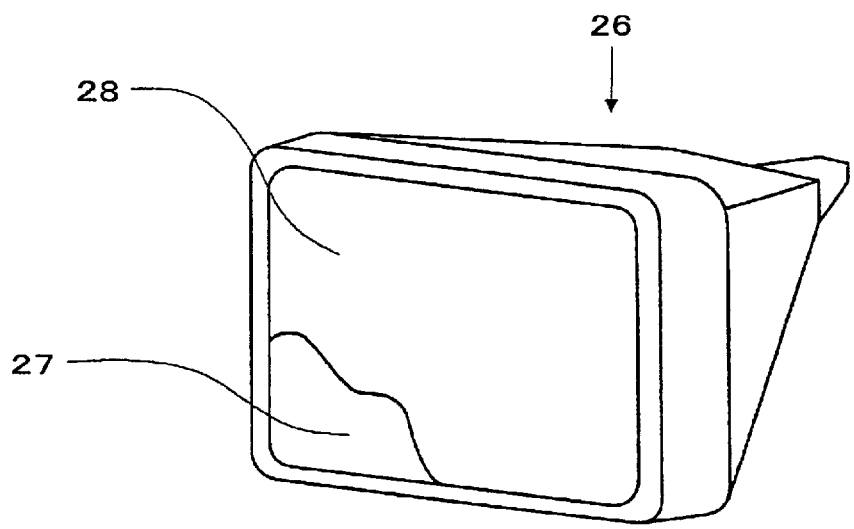
FIG. 3 is a perspective view of a CRT display having a solid-state EC device formed on a front face thereof according to an embodiment of the present invention.
Figure 4:
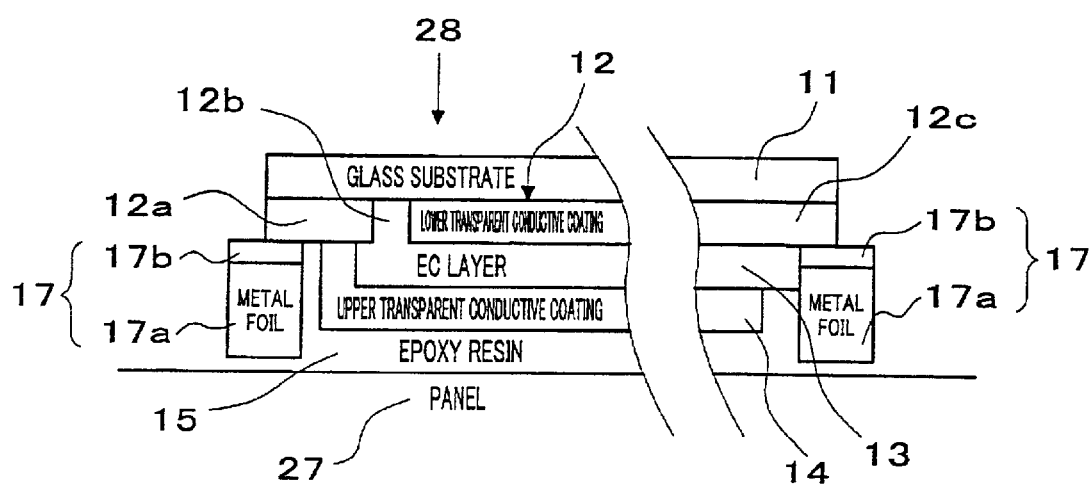
FIG. 4 is a magnified sectional view of the solid-state EC device and panel as shown in FIG. 3.
Figure 5:
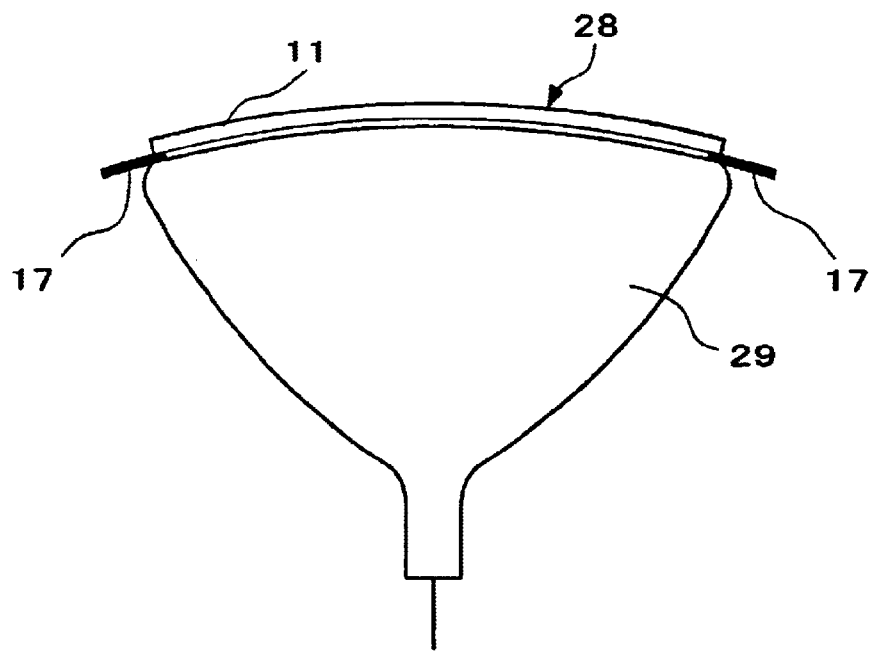
FIG. 5 is a schematic plan view of the solid-state EC device and CRT of the CRT display as shown in FIG. 3.

Referring next to FIGS. 3 through 5, a description will be given of a CRT display having the solid-state EC device formed on a front face thereof according to an embodiment of the present embodiment. FIG. 3 is a perspective view of the CRT display the front face of which is formed with the solid-state EC device according to the embodiment of the present invention. FIG. 4 is an enlarged sectional view of the solid-state EC device and a panel according to the embodiment as shown in FIG. 3. FIG. 5 is a schematic plan view of the solid-state EC device and the CRT of the CRT display as shown in FIG. 3.

In the present embodiment, on a front of a panel 27 of a CRT display 26 is formed a filter layer comprised of a solid-state EC device 28 that uses the glass panel 27 for an opposed glass plate, and is provided with metal foil terminals 17, 17 each including a metal foil 17a, to which an electrically conductive adhesive material 17b is bonded, at each end portion of an insulated portion 12a and a body portion 12c of the lower transparent conductive layer 12. The solid-state EC device 28 is directly bonded on a front face of the panel 27 with the epoxy resin 15 that is a sealant. The glass substrate 21 has a width dimension a little shorter than that of the glass panel, and is worked so as to have a thin thickness (0.5 mm or so). In FIG. 4, the same elements as the solid-state EC device 10 shown in FIG. 1 are designated by the same reference numerals for illustrating a structure of coatings in the solid-state EC device 28, and a description of such elements will be omitted herein.

This CRT display 26 employs the metal foil terminals 17, 17, and thereby allows lead-in terminals to be worked into various shapes according to a curved shape of a front face of a CRT 29, a shape of a housing of the CRT display 26, or the like upon attachment, so that the lead-in terminals may be made thinner (to several tens of micrometers, or so), and the width dimension of the glass substrate 11 may be made shorter than that of the glass panel of the CRT 29. Accordingly, as shown in FIG. 5, the CRT display 26 may have the solid-state EC device 28 directly attached to a front face of the CRT 29, and thus a filter may be constructed as a thin layer on the front face of the CRT display 26 without extra members for attachment. Moreover, the CRT display 26 has the glass substrate made smaller than the front face of the CRT 29, and therefore, allows the filter of the CRT display 26 to be miniaturized.

In the present embodiment, luminance or flicker of the panel may be adjusted by application of a predetermined driving voltage to the EC layer. A VDT hazard prevention filter as may be externally attached to a front face of the panel of the commonly used CRT display may also be used for the CRT display of the present embodiment.

In order to fabricate the above CRT display, an intermediate body of an EC device formed by layering upper and lower transparent conductive coatings and an EC layer between the coatings on a glass substrate is prepared, and the upper transparent conductive coating side of the intermediate body of the EC device is located near a front face of the glass panel of the CRT display. Then, metal foil terminals are bonded on a periphery of the intermediate body of the EC device, and a transparent resinous sealant is provided between the intermediate body of the EC device and the front face of the panel, so that a solid-state EC device using a glass panel for an opposed glass plate may be laminated, forming a filter layer on the front panel of the panel. In this instance, the glass plate is worked to have a dimension equal to or shorter than the width dimension of the glass panel. In addition, the metal foil terminals have a thickness as corresponding to the thickness of the intermediate body of the EC device and the transparent resinous sealant, and assumes a shape as conforming to the shape of the intermediate body of the EC device, a front surface of the panel, or the like. The intermediate body of the EC device and the glass panel are bonded with the transparent resinous sealant.

Although copper or aluminum were cited above as the metal foil materials in the present embodiment, any other metal materials may be used; moreover anti-corrosive treatment may be carried out as required in view of a usage pattern of the solid-state EC device, and it is thus to be understood that the above embodiment is described merely by way of example without limitation.

INDUSTRIAL APPLICABILITY

As described above, the inventive solid-state EC device includes metal foil terminals made of a metal foil to which an electrically conductive adhesive material is applied, and the metal foil terminals are bonded on each end portion of the lower transparent conductive coating and the insulated lower transparent conductive coating, so that attachment of the terminals is simply a matter of bonding the metal foil terminals each at a predetermined position, and the metal foil terminals may easily be worked into various shapes as conforming to the shape of the device. Further, the metal foil terminals are made of metal materials selected from copper and aluminum, and have undergone anti-corrosive treatment, serving to provide a more reliable solid-state EC device.

According to the present invention, on a front face of a panel of the CRT display is formed a filter layer comprised of a solid-state EC device that uses a glass panel for a opposed glass plate and includes metal foil terminals each made of a metal foil to which an electrically conductive adhesive material is applied, which metal foil terminals are provided each at end portions of the lower transparent conductive coating; thus, the present invention may provide a CRT display adjustable for transmittance or luminance within a specific range.

What is claimed is:

1. A solid-state electrochromic device comprising:
    a lower transparent conductive layer formed into filmy shape on a glass substrate, partially provided with a groove, and separated into two portions by the groove;

an electrochromic layer layered on the lower transparent conductive layer;

an upper transparent conductive layer formed into filmy shape over a portion insulated with the groove of the lower transparent conductive layer, and a top of the electrochromic layer; and a sealant and opposed glass plate laminated on the upper transparent conductive layer, wherein metal foil terminals made of a metal foil to which an electrically conductive adhesive material is applied are bonded to an end of the lower transparent conductive layer and an end of the insulated portion of the lower transparent conductive layer in order to apply a driving voltage to the electrochromic layer, the metal foil terminals extending between the opposed glass plate and the end of the lower transparent conductive layer and the end of the insulated portion of the lower transparent conductive layer.

2. A solid-state electrochromic device according to claim 1, wherein the metal foil terminals are made of any one of copper and aluminum foils.

3. A solid-state electrochromic device according to claim 1, wherein the metal foil terminals have undergone anti-corrosive treatment.

4. A mirror system using a solid-state electrochromic device, the electrochromic device comprising:

a metal reflective coating formed into filmy shape on a glass substrate;

a lower transparent conductive layer formed into filmy shape on the metal reflective coating, partially provided with a groove, and separated into two portions by the groove;

an electrochromic layer layered on the lower transparent conductive layer;

an upper transparent conductive layer formed into filmy shape over a portion insulated with the groove of the lower transparent conductive layer, and a top of the electrochromic layer; and a sealant and opposed glass plate laminated on the upper transparent conductive layer, wherein metal foil terminals made of a metal foil to which an electrically conductive adhesive material is applied are bonded to an end of the lower transparent conductive layer and an end of the insulated portion of the lower transparent conductive layer in order to apply a driving voltage to the electrochromic layer.

5. A CRT display including:

a glass panel; and a filter layer formed on a front face of the glass panel, the filter layer being comprised of a solid-state electrochromic device, wherein the solid-state electrochromic device uses the glass panel for an opposed glass plate, and includes a lower transparent conductive layer and metal foil terminals to which an electrically conductive adhesive material is applied, and the metal foil terminals are located at an end portion of the lower transparent conductive layer.

6. A CRT display according to claim 5, wherein the filter layer comprised of the electrochromic device includes:

a lower transparent conductive layer formed into filmy shape on a glass substrate, partially provided with a groove, and separated into two portions by the groove;

an electrochromic layer layered on the lower transparent conductive layer;

an upper transparent conductive layer formed into filmy shape over a portion insulated with the groove of the lower transparent conductive layer, and a top of the electrochromic layer; and a sealant and opposed glass plate laminated on the upper transparent conductive layer, wherein metal foil terminals made of a metal foil to which an electrically conductive adhesive material is applied are bonded to an end of the lower transparent conductive layer and an end of the insulated portion of the lower transparent conductive layer in order to apply a driving voltage to the electrochromic layer.

* * * * *